United States Patent Office 3,194,350
Patented July 13, 1965

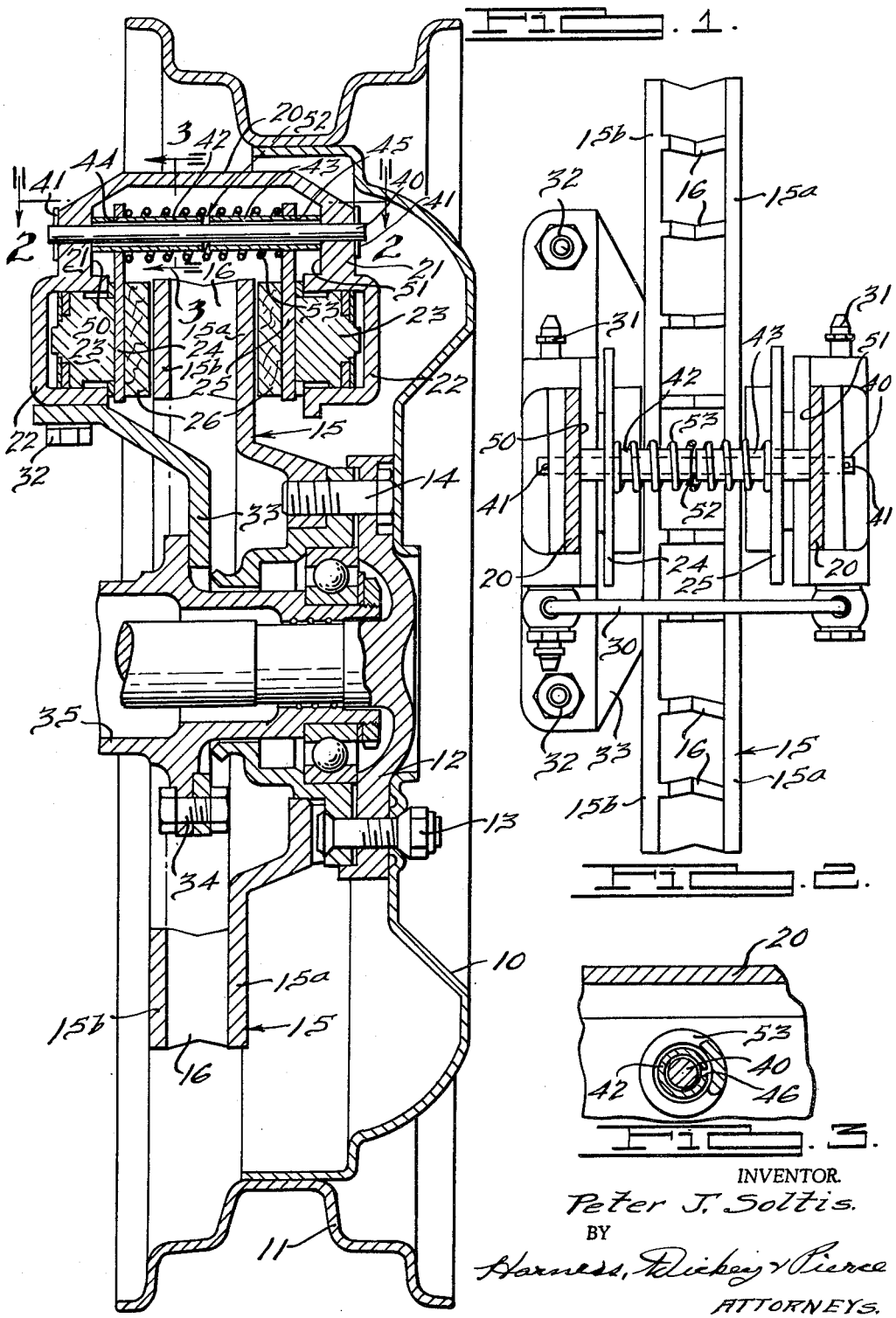

3,194,350
AUTOMATIC ADJUSTER FOR DISK BRAKES
Peter J. Soltis, Detroit, Mich., assignor to Kelsey-Hayes Company, Romulus, Mich., a corporation of Delaware
Filed May 21, 1963, Ser. No. 282,007
7 Claims. (Cl. 188—73)

This invention relates to an automatic adjuster for disk brakes and, more particularly, to improvements in structures of this type adapted to simplify, render more efficient, and improve the same generally.

One of the important objects of this invention is to provide automatic adjusting means for the friction members of a disk brake whereby as the friction members wear, their retracted or released position is correspondingly adjusted and the clearance between the friction members and the braking disk remains substantially constant regardless of the wear on the friction members.

Another object of this invention is to provide an automatic adjuster which is so reduced in the number and character of its component parts as to approach the ultimate in structural simplicity and wherein its structural simplicity creates an economy in its manufacture, installation and maintenance costs.

The various objects and advantages, and the novel details of construction of one commercially practical embodiment of the invention, will become more apparent as this description proceeds, especially when considered in connection with the accompanying drawings, in which:

FIGURE 1 is a sectional view through a wheel and disk brake assembly constructed in accordance with this invention;

FIGURE 2 is a sectional elevational view taken substantially on the plane indicated by line 2—2 in FIGURE 1; and FIGURE 3 is a detail section taken substantially on line 3—3 in FIGURE 1.

The disk brake of this invention is shown as being associated with a vehicle wheel 10 having a rim 11 secured to the axle flange 12 by means of bolt and nut assemblies 13.

Also secured to the axle flange 12 by means of bolts 14 for rotation with the wheel 10 is a disk 15. In accordance with this invention, the disk 15 is formed with a pair of spaced braking walls 15a and 15b. The spaced walls 15a and 15b are connected by spaced axially and radially extending walls or members 16 which function as fan blades and serve to move cooling air in a radially outwardly direction between the walls 15a and 15b when the disk 15 is rotated. This serves to reduce the heat generated by the engagement of the brake shoes with the disk, as will be apparent.

Enclosing a part only of the braking surface of the disk 15, is a housing 20 comprising sides 21 extending towards the axis of the disk 15. As will be seen from FIGURE 1, the sides 21 are spaced on opposite sides of the disk 15 and are shaped to provide cylinders 22 in which brake shoe actuating pistons 23 are disposed. These pistons 23 engage brake shoes 24 and 25 provided with friction surfaces 26 adapted to engage the spaced walls 15a and 15b of the disk 15. The closed outer ends of the cylinders 22 may be connected by a conduit or pipe 30 and each cylinder 22 is provided with a fluid pressure connection 31 connected to a source of fluid pressure such as a master cylinder (not shown).

The housing 20 is connected by bolts or the like 32 to a torque plate 33 which is connected by nut and bolt assemblies 34 to a stationary or nonrotatable part 35 of the wheel axle. Thus, as is customary with disk brakes of this type, the housing 20 is nonrotatably supported with respect to the disk 15 which rotates with the wheel 10.

Extending between the spaced sides 21 of the housing 20 is a rod or rod-like member 40 which extends through the side walls 21 and is secured against longitudinal movement by pins 41. Slidably mounted on the rod 40 is a pair of sleeves 42 and 43. The sleeve 42 frictionally engages an aperture 44 in the brake shoe 24 and the sleeve 43 frictionally engages an aperture 45 in the brake shoe 25.

A convenient method for frictionally engaging the sleeves 42 and 43 with the apertures 44 and 45 in the brake shoes 24 and 25 is to split each sleeve longitudinally as indicated at 46 in FIGURE 3. The expanded condition of the sleeves 42 and 43 is such that they provide frictional engagement with the brake shoes 24 and 25 so as to normally prevent relative movement between the brake shoes and the sleeves.

The outer ends of the sleeves 42 and 43 normally engage stop surfaces 50 and 51, respectively, on the side walls 21 of the housing 20 in the retracted position of the brake shoes 24 and 25. When the sleeves and brake shoes are in this retracted position, a gap 52 exists between the adjacent ends of the sleeves 42 and 43. A coil spring 53 surrounding the sleeves 42 and 43 abuts at its opposite ends against the brake shoes 24 and 25 and normally urges the brake shoes to the retracted position illustrated in FIGURE 1. The strength of the spring 53 is insufficient to cause relative movement between the brake shoes and sleeves but is sufficient to hold the brake shoes in the position illustrated in FIGURE 1 with the ends of the sleeves 42 and 43 engaging the stops 50 and 51.

When the brakes are applied, the brake shoes 24 and 25 move toward the adjacent surfaces 15b and 15a of the disk 15 and during this movement, the brake shoes will carry the sleeves 42 and 43 with them until the gap 52 is closed and the adjacent ends of the sleeves abut one another. If, as a result of wear on the friction surfaces 26, further movement of the brake shoes is necessary in order to effect braking contact with the disk, the brake shoes will slide on their respective sleeves and assume a new position with respect thereto. In other words, the pistons 23 force the brake shoes a sufficient distance to effect a braking contact with the disk and in doing so will overcome the friction between the brake shoes and sleeves and cause the brake shoes to move longitudinally thereon toward one another. Thereafter when the brakes are released, the spring 53 will effect a retraction of the shoes 24 and 25, but each shoe will remain in its new position on the sleeves 42 and 43. As will be evident, retraction of the shoes is limited by the abutment of the outer ends of the sleeves 42 and 43 with the stop surfaces 50 and 51. Thus, in the released condition of the brakes, the friction material on each brake shoe is kept closely spaced from the adjacent surface of the disk, irrespective of the amount of wear that has occurred on the friction material 26. Thus, very little pedal travel will be needed to cause a complete application of the brakes, even when the brake linings 26 are worn.

Stated another way, when the pistons 23 are actuated to apply the brakes, the brake shoes 24 and 25 and their respective sleeves 42 and 43 move towards one another until the gap 52 is closed and the adjacent ends of the sleeves 42 and 43 abut. When the brake linings 26 are new, this movement will be sufficient to effect a complete application of the brakes. If, however, the friction material 26 on the brake shoes has become worn, the pistons 23 will move the brake shoes 24 and 25 relative to their respective sleeves a sufficient distance to effect a proper application of the brakes. When thereafter the brake shoes 24 and 25 and sleeves 42 and 43 are returned to the retracted position by the spring 53, the brake shoes will occupy new positions on the sleeves and thus the extent of retracted movement of the brake shoes away from the disk when the brakes are released is maintained substantially constant. As has been previously stated, the spring 53 has insufficient strength to effect a sliding movement of the brake shoes on the sleeves 42 and 43.

From the foregoing, it will be apparent that there is provided an automatic adjuster for disk brakes which is so reduced in the number and character of its component parts as to approach the ultimate in structural simplicity thereby creating an economy in its manufacture, installation and maintenance costs.

While one commercially practical embodiment of the invention has been described and illustrated herein somewhat in detail, it will be understood that various changes may be made as may come within the purview of the accompanying claims.

What is claimed is:

1. A disk brake comprising a rotatable disk, a non-rotatable housing straddling the periphery of said disk, a pair of opposed movable brake shoes, means carried by said housing for moving said brake shoes toward said disk, a rod extending between the sides of said housing, a pair of sleeves slidably mounted on said rod and frictionally engaging said brake shoes, and a spring surrounding said sleeves and normally urging said sleeves and brake shoes away from one another with the outer ends of the sleeves abutting said housing, each brake shoe and its sleeve being movable as a unit upon application of the brake until the adjacent ends of said sleeves abut whereupon said brake shoes may move relative to said sleeves to assume a new position with respect thereto to effect automatic adjustment of the retracted distance between said brake shoes and disk.

2. A disk brake comprising a rotatable disk, a non-rotatable housing straddling the periphery of said disk, a pair of opposed brake shoes, brake shoe actuating pistons carried by said housing, a rod extending between the sides of said housing, a pair of sleeves slidably mounted on said rod and frictionally engaging apertures in said brake shoes, and a spring normally urging said sleeves and brake shoes apart with the outer ends of said sleeves abutting said housing, whereby upon application of the brake each brake shoe and its sleeve moves as a unit toward each other until the adjacent ends of said sleeves abut, said brake shoes moving relative to said sleeves if further movement thereof is necessary due to wear on the brake shoes, said brake shoes thereupon assuming a new position on said sleeves to effect automatic adjustment of the retracted distance between said brake shoes and disk.

3. A disk brake comprising a rotatable disk, a non-rotatable housing straddling the periphery of said disk, a pair of opposed brake shoes having friction surfaces, brake shoe actuating pistons carried by said housing, and means for automatically adjusting said brake shoes depending upon the wear on the friction surfaces thereof comprising, a rod extending between the sides of said housing, a pair of split sleeves slidably mounted on said rod, said sleeves frictionally engaging apertures formed in said brake shoes so as to normally hold said brake shoes in fixed position on said sleeves, a spring surrounding said sleeves and normally urging said sleeves and brake shoes away from one another with the outer ends of the sleeves abutting said housing, said spring being insufficient to cause relative movement between said brake shoes and sleeves, each brake shoe and its sleeve being movable as a unit upon application of the brake until the adjacent ends of said sleeves abut, whereupon said brake shoes will move relative to said sleeves if further movement thereof is necessary due to wear on said friction surfaces, said brake shoes thereupon assuming a new position on said sleeves to effect automatic adjustment of the retracted distance between said brake shoes and disk when the brakes are released.

4. A disk brake comprising a rotatable disk, a non-rotatable housing straddling the periphery of said disk, a pair of opposed brake shoes having friction surfaces, brake shoe actuating pistons carried by said housing, and means for automatically adjusting said brake shoes depending upon the wear on the friction surfaces thereof comprising, a rod extending between the sides of said housing, said housing forming stops at each end of said rod, a pair of longitudinally split sleeves slidably mounted on said rod and engaging said stops in the released position of the brake, said sleeves frictionally engaging apertures formed in said brake shoes thereby normally holding said brake shoes in fixed position on said sleeves, a spring normally urging said brake shoes and sleeves apart with the outer ends of said sleeves abutting said stops, the strength of said spring being insufficient to cause relative movement between said brake shoes and sleeves, each brake shoe and its sleeve being movable as a unit upon application of the brakes until the adjacent ends of said sleeves abut, whereupon said brake shoes will move relative to said sleeves if further movement thereof is necessary, due to wear, to effect braking engagement with said disk, said brake shoes thereupon assuming new positions on said sleeves to limit the extent of the retractive movement of the brake shoes away from the disk when the brakes are released.

5. A device as described in claim 2 in which said disk comprises axially spaced braking surfaces having a radially extending space therebetween.

6. A device as described in claim 2 in which said disk comprises axially spaced walls providing braking surfaces having a radially extending space therebetween, and radially extending members in said space functioning as fan blades serving to move cooling air in a radially outward direction between said walls.

7. A disk brake comprising a rotatable disk, a non-rotatable housing straddling a portion of the periphery of said disk, a pair of opposed movable brake shoes, brake shoe actuating pistons carried by said housing, a rod carried by said housing, a pair of sleeve-like members slidably mounted on said rod and frictionally engaging said brake shoes, and a spring normally urging said sleeve-like members and brake shoes apart with the outer ends of said sleeve-like members abutting stops carried by said housing, whereby upon application of the brake each brake shoe and its sleeve moves as a unit toward each other until the adjacent ends of said sleeves abut, said brake shoes moving relative to said sleeves if further movement thereof is necessary due to wear on the brake shoes, said brake shoes thereupon assuming a new position on said sleeves to effect automatic adjustment of the retracted distance between said brake shoes and disk.

References Cited by the Examiner

UNITED STATES PATENTS

| | | | |
|---|---|---|---|
| 2,369,328 | 2/45 | Watts | 188—264 |
| 2,384,297 | 9/45 | Goepfrich. | |
| 2,551,252 | 5/51 | Du Bois | 188—72 |
| 2,705,058 | 3/55 | Harter | 188—196 X |

ARTHUR L. LA POINT, *Primary Examiner.*

DUANE A. REGER, *Examiner.*